United States Patent [19]
Ichikawa et al.

[11] Patent Number: 6,155,380
[45] Date of Patent: Dec. 5, 2000

[54] GREASE FILLING DEVICE FOR ELECTRIC MOTOR

[75] Inventors: Hachiro Ichikawa; Masatoshi Katagiri; Keizo Yoshikawa; Mitsunori Uchida; Koichi Horie, all of Nagoya, Japan

[73] Assignee: Central Japan Railway Company, Nagoya, Japan

[21] Appl. No.: 09/117,599

[22] PCT Filed: Mar. 16, 1998

[86] PCT No.: PCT/JP98/01104

§ 371 Date: Jul. 31, 1998

§ 102(e) Date: Jul. 31, 1998

[87] PCT Pub. No.: WO99/47849

PCT Pub. Date: Sep. 23, 1999

[51] Int. Cl.[7] ........................................ F16C 1/24
[52] U.S. Cl. .................. 184/5.1; 184/7.4; 184/105.2; 310/90; 384/473; 222/58; 222/77
[58] Field of Search ................... 184/5.1, 7.4, 29, 184/105.2, 105.1; 310/90; 384/462, 466, 471, 473, 130, 477; 277/401, 408, 364; 222/58, 77

[56] References Cited

U.S. PATENT DOCUMENTS

| | | | |
|---|---|---|---|
| 2,427,233 | 9/1947 | Shartle | 184/5.1 |
| 2,839,160 | 6/1958 | Wright | 184/5.1 |
| 2,873,817 | 2/1959 | Gerber | 184/5.1 |
| 3,048,236 | 8/1962 | Larke et al. | 184/5.1 |
| 3,268,638 | 8/1966 | Tann | 184/5.1 |
| 3,365,024 | 1/1968 | Freda | 184/5.1 |
| 3,797,089 | 3/1974 | Abel | 184/5.1 |
| 4,113,059 | 9/1978 | Markovski | 184/5.1 |
| 4,754,848 | 7/1988 | Azzopardi et al. | 184/29 |
| 4,762,252 | 8/1988 | Hyer et al. | 222/58 |
| 4,778,450 | 10/1988 | Kamen | 222/58 |
| 5,080,198 | 1/1992 | Rice | 184/5.1 |
| 5,109,955 | 5/1992 | Clark | 184/105.2 |

FOREIGN PATENT DOCUMENTS

| | | |
|---|---|---|
| 52-66130 | 6/1977 | Japan . |
| 63-168397 | 11/1988 | Japan . |
| 3-37497 | 2/1991 | Japan . |
| 329135 | 5/1948 | Switzerland ............. 384/473 |
| 597766 | 2/1948 | United Kingdom ........ 184/5.1 |
| 853553 | 11/1960 | United Kingdom ........ 384/473 |

*Primary Examiner*—David A. Bucci
*Assistant Examiner*—Chong H. Kim
*Attorney, Agent, or Firm*—Davis and Bujold

[57] ABSTRACT

Grease fed from a grease tank 10 to a metering force feeder 22 is fed into an injection cylinder 30 after the weight of the grease is precisely measured, and the total amount of the grease in the injection cylinder 30 is injected from the nozzle 34. The nozzle 34 can advance toward an electric motor 60. When the nozzle 34 advances, a first packing 50 and a second packing 52 provided on a tip-end face 34a closely contact to an outer ring 66a and an inner ring 66b of a bearing 66, respectively. In the condition, when the grease is injected from an injection hole 34b, the grease is pushed into an operation space of rolling elements 66c of the bearing 66. A grease pocket 68 is also filled with the grease.

20 Claims, 3 Drawing Sheets

GREASE FILLING DEVICE FOR ELECTRIC MOTOR

TECHNICAL FIELD

The present invention relates to a grease filling device for an electric motor which can fill a bearing of the electric motor with grease, particularly to a grease filling device for an electric motor suit able for filling a bearing with new grease after cleaning the bearing of a main motor for a railroad car whose bearing needs to be periodically cleaned and filled with grease.

BACKGROUND ART

The bearing of the main motor for the railroad car is heretofore cleaned periodically. In many cases, since the bearing of the main motor is in a position in which only by removing a cover outside the main motor, an outer end face of the bearing is exposed to the outside, the bearing can be cleaned by spraying cleaning liquid from an injection nozzle onto the bearing without removing the bearing from the main motor.

However, to fill the cleaned bearing with new grease, there has been no appropriate means for filling the bearing with a proper amount of grease while the bearing is not detached from the main motor. Therefore, the bearing was manually filled with grease, and the process from the cleaning to the filling of the bearing with grease could not be automated.

The present invention has been developed to solve the problem, and an object of the invention is to provide a grease filling device for an electric motor which can fill a bearing with a proper amount of grease without detaching the bearing from the electric motor.

DISCLOSURE OF THE INVENTION

A constitution of the invention will be described in detail.

The present invention provides a grease filling device for a bearing of an electric motor which can fill the bearing with grease without removing the bearing from said electric motor, the bearing having a structure constituted of an outer ring fixed on the electric motor, an inner ring disposed inside the outer ring and a rolling element interposed between said outer ring and the inner ring, being disposed in a position in which an outer end face can be exposed outside the electric motor and rotatably supporting a rotation shaft of said electric motor in the position, comprising: a nozzle being able to inject the grease supplied from a grease supply source via at least one injection hole in a tip-end face; a first packing projected from the tip-end face of the nozzle for adhering to the outer ring of said bearing when the tip-end face of the nozzle is pushed against the outer end face of said bearing; and a second packing projected from the tip-end face of said nozzle for adhering to the inner ring of said bearing when the tip-end face of the nozzle is pushed against the outer end face of said bearing, wherein said first packing, the second packing and the tip-end face of said nozzle form an annular groove and said injection hole is formed in the annular groove.

In the grease filling device having this constitution, when the tip-end face of the nozzle is pushed against the outer end face of the bearing, the first packing closely contacts to the outer ring of the bearing while the second packing closely contacts to the inner ring of the bearing. In the condition, the annular groove formed by the first packing, the second packing and the nozzle tip-end face is connected only to the operation space of the rolling element of the bearing. When the grease is supplied from the grease supply source, the grease injected from the injection hole is pushed into the operation space of the rolling element of the bearing or pushed out into the annular groove to flow into the operation space of the rolling element of the bearing and further into the grease pocket in the position adjacent to the inner end face of the bearing. In either case, the grease does not leak outside the bearing.

Therefore, when such grease filling device is used, the outer covering of the electric motor is not made dirty by the grease even if the filling operation is performed without removing the bearing from the electric motor. Also, when the supply of the grease to the nozzle is controlled by the control device, the grease filling does not have to be manually performed, and the grease filling process can be automated.

Meanwhile, when the invention is provided with the following constitutions, the function can be fulfilled.

First, a plurality of said injection holes may be formed in said annular groove.

In the grease filling device, as compared with the grease filling device having only one injection hole, the amount of the grease which is temporarily pushed out into the annular groove to flow into the operation space of the rolling element of the bearing is decreased and the amount of the grease which is directly pushed into the operation space of the rolling element of the bearing is increased. Even when the same quantity of the grease is injected in total, the grease filling can be completed more quickly.

Secondly, a nozzle drive mechanism may be provided for moving said nozzle to a forward position or a backward position, the tip-end face of said nozzle closely contacts to the outer end face of said bearing in said forward position, and the tip-end face of said nozzle is apart from the outer end face of said bearing in said backward position.

In the grease filling device, by moving the nozzle forward/backward with the force of the nozzle drive mechanism, the nozzle can be disposed in an appropriate position without moving the electric motor. Therefore, trouble caused by the movement of the electric motor is not easily induced.

The nozzle drive mechanism can have various concrete structures. For example, there are a constitution in which the nozzle is attached to a movable element disposed movable forward/backward and the movable element is operated by using an air cylinder or a hydraulic cylinder; a constitution in which power from the motor is transmitted via a belt and a pulley to operate the movable element; a constitution in which a pinion engaged with a rack is rotated and operated with a motor in such a manner that the movable element moves together with the rack; and the like. In this manner, any nozzle drive mechanism may be used. Furthermore, to control the movement toward the forward/backward position, there are a method in which the stroke of the air cylinder or the hydraulic cylinder is adjusted beforehand to a desired quantity; a method in which the position of the movable element is detected with a limit switch for braking; a method in which a drive power source able to instruct a drive quantity like a stepping motor is used; or the like. Such optional constitution can be used.

Thirdly, two said nozzles are disposed opposite to two said bearings provided on opposite end faces of the electric motor, the nozzles are allowed to advance toward said bearings, and said electric motor can thus be sandwiched between the tip-end faces of the two nozzles.

In the grease filling device, since the electric motor is sandwiched by the two nozzles, as compared with when the nozzle is pushed against the electric motor only from one side, the position of the electric motor can be easily stabilized. Especially, by setting the pressures of the two nozzles to substantially the same, the electric motor is prevented from being pushed and moved only by either nozzle, even if the pressures are slightly strong. Therefore, by setting the pressures of the nozzles slightly strong, the adhesion properties of the nozzles can be enhanced.

Fourthly, a centering mandrel is projected from a central position of the tip-end face of said nozzle toward said bearing, said nozzle is provided for being able to advance/retreat along said centering mandrel, and a tip-end of said centering mandrel is configured in such a manner that the centering mandrel is displaced toward a position in which said centering mandrel coincides with a rotation center only by bringing the tip-end in contact with the vicinity of the rotation center of said electric motor.

In the grease filling device, by bringing the centering mandrel in contact with the vicinity of the rotation center of the electric motor, the centering mandrel is displaced to the position in which the centering mandrel coincides with the rotation center. By moving the nozzle forward along the centering mandrel, the nozzle can be pushed against the bearing while the center of the nozzle is precisely aligned with the rotation center of the bearing.

Additionally, the tip-end configuration of the centering mandrel can be of any concrete configuration as long as the centering mandrel coincides with the rotation center only by bringing the centering mandrel in contact with the vicinity of the rotation center of the electric motor. For example, one of the tip end of the centering mandrel and the vicinity of the rotation center of the electric motor has a recess and the other has a projection. In this case, when both the recess and the projection are closely engaged with each other, the displacement toward the sideway is regulated by opposite side walls. Alternatively, when the projection end abuts on the deepest portion of the opposite recess, the displacement of the projection end outside the deepest portion is regulated.

Fifthly, the nozzle is configured in such a manner that a hole for allowing the rotation shaft of said electric motor to escape is formed in the center of the tip-end face and structured in such a manner that while a projection of the rotation shaft of said electric motor is introduced in the hole, the tip-end face of said nozzle is pushed against the bearing provided in the vicinity of a root of the projection.

In the grease filling device, even when the rotation shaft is projected from the electric motor, by pushing the tip-end face of the nozzle against the bearing provided in the vicinity of the root of the projection, the grease filling can be performed. Therefore, a labor hour for removing the rotation shaft from the electric motor is not necessary at all. At the same time, a problem that the grease filling cannot be performed because the rotation shaft cannot be disengaged from the electric motor does not occur.

Sixthly, there is provided a constant weight feed device which can feed a predetermined weight of grease toward a downstream side of a flow path between the grease supply source and said nozzles.

In the grease filling device, the constant weight of grease can be supplied. For example, different from the constitution in which a constant volume of grease is supplied, a problem that the amount of the grease becomes short because bubbles are included in the grease does not occur.

BEST MODE OF PRACTICING THE INVENTION

To further detail the present invention, an example of a grease filling device for an electric motor according to the invention will be described with reference to the accompanying drawings. Additionally, to facilitate the understanding, a detail structure is omitted from the accompanying drawings.

Figure 1:
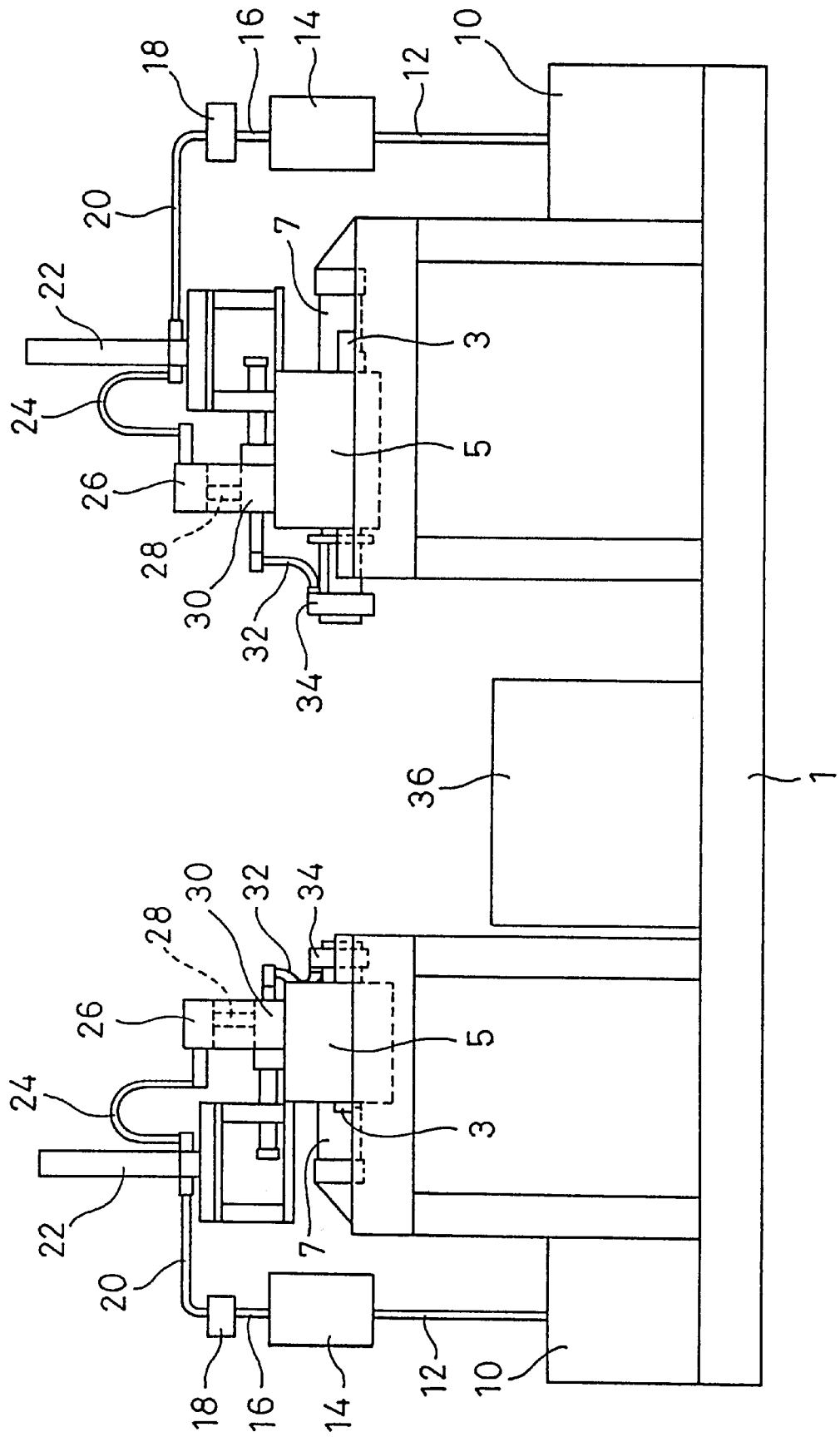
FIG. 1 is a front view showing an entire structure of a preferred grease filling device according to the invention.

FIG. 1 is a front view showing an entire structure of a preferred grease filling device according to the invention. The grease filling device functionally has a symmetrical constitution, although right and left detail configurations are different from each other. Therefore, constituting portions having the same function on opposite sides are denoted with the same numerals.

The grease filling device is provided with movable frames 5 which can advance/retreat along rails 3 fixed on a base frame 1, and each movable frame 5 is operated by an air cylinder 7 to advance/retreat.

On the base frame 1, a grease tank 10 is also mounted, the grease tank 10 is connected via a pressure hose 12 to a force feed pump 14, and the force feed pump 14 draws up grease from the grease tank 10. The force feed pump 14 is connected via a pressure hose 16, an electromagnetic valve 18 and a pressure hose 20 to a metering force feeder 22, and the grease force-fed from the force feed pump 14 is injected to the metering force feeder 22 in response to operation of the electromagnetic valve 18. The metering force feeder 22 is further connected via a pressure hose 24, an electromagnetic valve 26 and a pipe 28 to an injection cylinder 30, and the grease force-fed by the metering force feeder 22 is injected to the injection cylinder 30 in response to operation of the electromagnetic valve 26. The injection cylinder 30 is further connected via a pressure hose 32 to a nozzle 34, and the grease force-fed by the injection cylinder 30 is spouted from the nozzle 34. Meanwhile, among these components, the metering force feeder 22, the electromagnetic valve 26, the injection cylinder 30 and the nozzle 34 are fixed to the movable frame 5, and when the movable frame 5 is operated, the components advance/retreat together with the movable frame 5.

A rest 36 is further mounted on the base frame 1, and a main motor can be rested on a top face of the rest 36.

Figure 2:
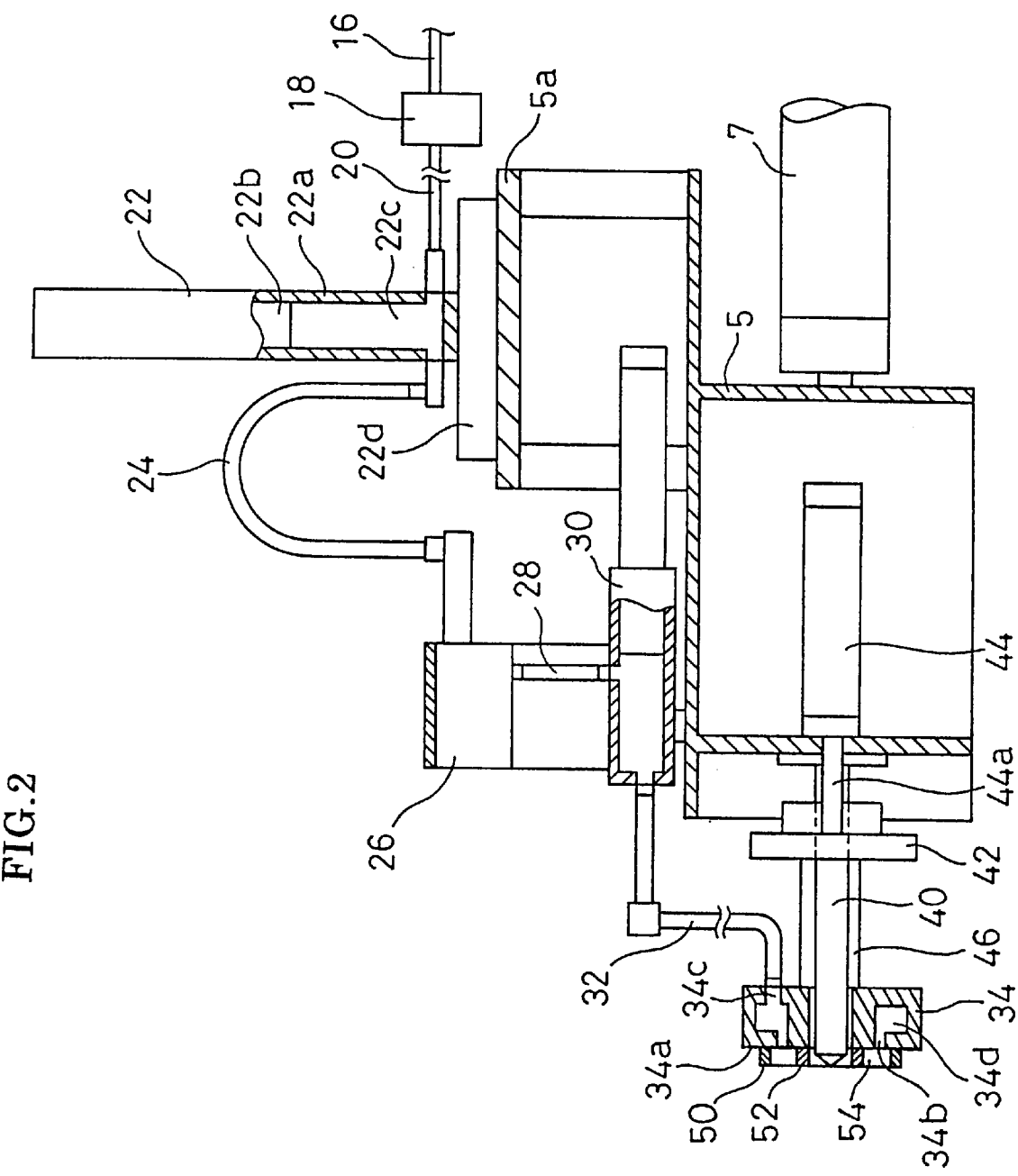
FIG. 2 is a vertical sectional view of a main portion of the grease filling device.

FIG. 2 is a vertical sectional view of a main portion of the grease filling device.

The metering force feeder 22 is fixed on an upper step 5a of the movable frame 5. The metering force feeder 22 has a grease filled chamber 22c constituted of a cylinder 22a and a piston 22b, and the grease filled chamber 22c is filled with the grease force-fed from the upstream side of a flow path. When the grease filled chamber 22c is filled with the grease, the electromagnetic valve 26 is closed, an air chamber (not shown) on the opposite side of the grease filled chamber 22c via a piston 22b is opened to an atmospheric pressure or reduced in pressure, then the electromagnetic valve 18 is opened. Thereby, the grease flows from the upstream side of the flow path into the grease filled chamber 22c. As the inner pressure of the grease filled chamber 22c rises, the piston 22b moves upward. To stop the grease from flowing into the grease filled chamber 22c, the electromagnetic valve 18 may be closed. Furthermore, in the condition pressurized air is allowed to flow in the air chamber which is positioned on the opposite side of the grease filled chamber 22c. Then, when the electromagnetic valve 26 is opened, the piston 22b moves downward as the inner pressure of the air chamber rises, and the grease is forced from the grease filled chamber 22c out to the downstream side of the flow path.

Moreover, in a structure of the metering force feeder 22, the cylinder 22a is fixed on a meter 22d, and the weight of the grease in the grease filled chamber 22c can be measured by using the meter 22d. In a control device (not shown) for controlling the opening/closing of the electromagnetic valve 26, the electromagnetic valve 26 is controlled based on a change in weight detected by the meter 22d, so that a specified amount of grease is fed from the metering force feeder 22. Specifically, to feed the specified weight a of grease from the metering force feeder 22, first the grease filled chamber 22c is filled with an amount b more than enough of grease (i.e., b>a), and the amount b is measured with the meter 22d by the control device. Subsequently, after the electromagnetic valve 26 is opened by the control device, the grease is fed from the grease filled chamber 22c until an amount (b−a) is measured with the meter 22d. Then, the electromagnetic valve 26 is closed by the control device. By feeding the grease from the metering force feeder 22 in this manner, a substantially necessary amount of grease can be precisely supplied even if the grease includes bubbles, different from the case where a specified volume of grease is supplied.

As aforementioned, since the metering force feeder 22 is provided for precisely measuring the weight, a force feeding capability of the metering force feeder 22 is not necessarily high. Therefore, in the grease filling device, once the grease fed from the metering force feeder 22 is injected to the injection cylinder 30, a high pressure is applied to the injection cylinder 30, and the total amount of grease injected to the injection cylinder 30 is spouted from the nozzle 34. When the grease is injected to the injection cylinder 30, to help the grease to be injected, a negative pressure is applied to the injection cylinder 30. Furthermore, when the grease is injected out of the injection cylinder 30, the electromagnetic valve 26 is closed, which prevents the grease from flowing backward to the upstream side of the flow path.

A structure and operation of the nozzle 34 will be described in more detail.

As aforementioned, the nozzle 34 moves together with the movable frame 5, but it can further move relative to the movable frame 5. Specifically, a centering mandrel 40 is fixed to the movable frame 5, and a flanged circular plate 42 slidable along the centering mandrel 40 is attached to an outer periphery of the centering mandrel 40. The flanged circular plate 42 is interconnected to a piston rod 44a of an air cylinder 44, and the flanged circular plate 42 is operated to advance/retreat by the air cylinder 44. Opposite arms 46 are extended from the flanged circular plate 42, between which the centering mandrel 40 is disposed, and the nozzle 34 is fixed to tip ends of the arms 46. The nozzle 34 has an annular outer configuration, and the centering mandrel 40 is passed through an annular inner hole of the nozzle. The nozzle 34 supported by the structure moves relative to the movable frame 5 when the air cylinder 44 is operated. Additionally, the pressure hose 32 for connecting the injection cylinder 30 and the nozzle 34 is sufficiently flexible and long. Therefore, the nozzle 34 is not inhibited from advancing.

Furthermore, a first packing 50 and a second packing 52 are projected from a tip-end face 34a of the nozzle 34. The first packing 50 and the second packing 52 are rubber annular bodies. The first packing 50, the second packing 52 and the tip-end face 34a of the nozzle 34 form an annular groove 54. An injection hole 34b is formed inside the annular groove 54 for injecting the grease. There are thirty two injection holes 34b in total, and they are formed at predetermined pitches in a bottom of the annular groove 54 partially forming the tip-end face 34a of the nozzle 34. The grease is fed from the upstream side of the flow path via the pressure hose 32 to the nozzle 34, injected from an injection port 34c in the rear end of the nozzle 34 to an annular space 34d in the nozzle 34, branched from the annular space 34d to the thirty two injection holes 34b, and further fed from each injection hole 34b to the outside.

Figure 3:
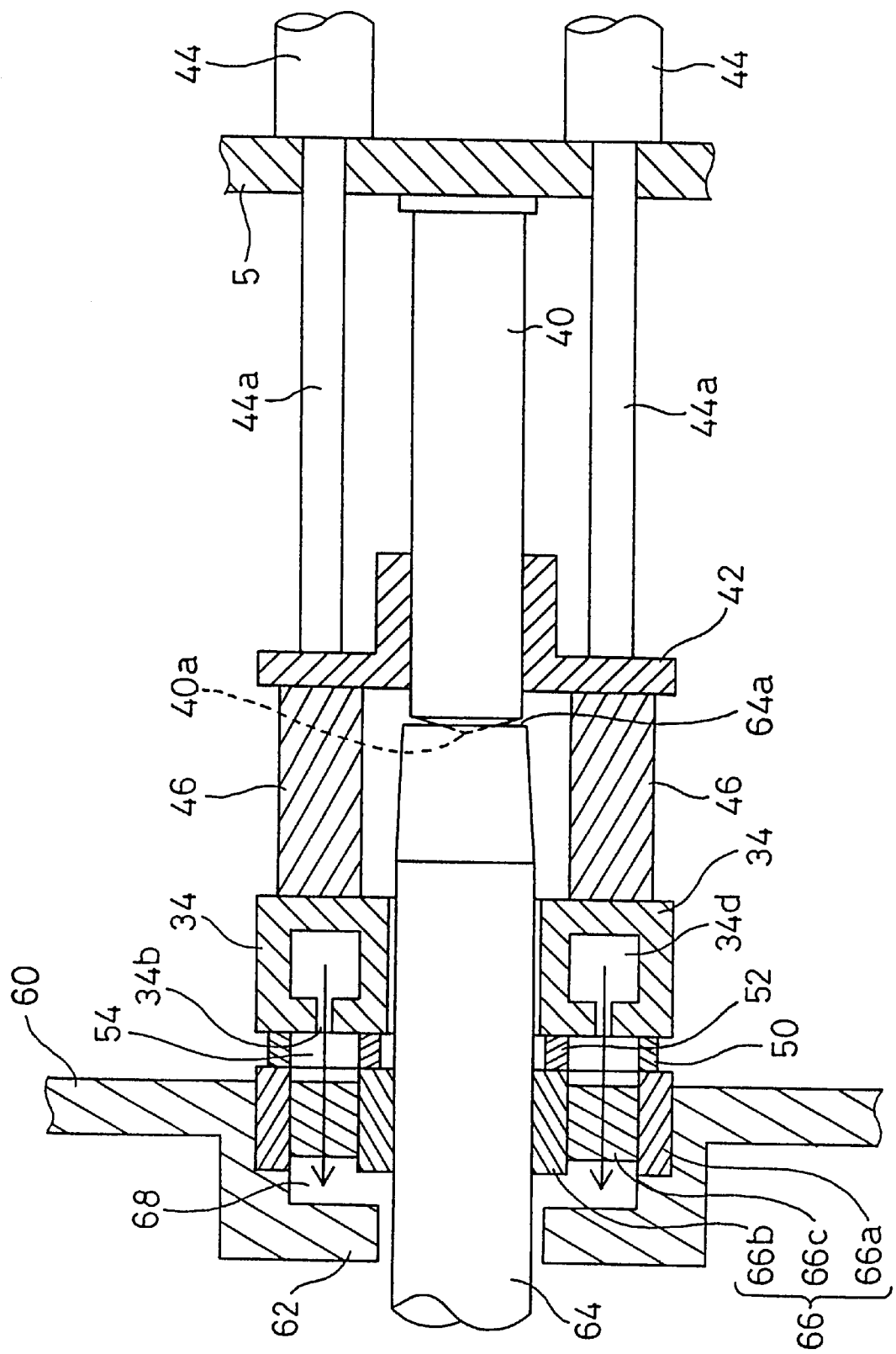
FIG. 3 is a transverse sectional view showing a condition in which a nozzle of the grease filling device advances along a centering mandrel and is pressed against a bearing.

FIG. 3 is a transverse sectional view showing a condition in which the nozzle 34 advances along the centering mandrel 40. FIG. 3 also shows a structure of an electric motor 60 against which the nozzle 34 is pressed.

The electric motor 60 is provided with a bearing 66 disposed in a position in which an outer end face of the bearing is exposed to the outside of the electric motor 60 and an inner end face of the bearing is adjacent to a seal portion 62 for inhibiting foreign particles from entering the electric motor 60. In the position, a rotation shaft 64 of the electric motor 60 is rotatably supported by the bearing 66. The bearing 66 is constituted of an outer ring 66a fixed to the electric motor 60, an inner ring 66b disposed inside the outer ring 66a and plural rolling elements 66c arranged at predetermined pitches in an annular space between the outer ring 66a and the inner ring 66b. There are clearances among the adjoining rolling elements 66c, and the clearances and a grease pocket 68 between the rolling elements 66c and the seal portion 62 are filled with grease.

An operation in which the nozzle 34 of the grease filling device is pushed against the electric motor 60 is now explained.

In the initial condition, the movable frame 5 is in a backward position (the position farthest from the electric motor 60). The nozzle 34 is also in the backward position (the position farthest from the electric motor 60). In this condition, a tip end 40a of the centering mandrel 40 is passed through the nozzle 34, and projected from the first packing 50 and the second packing 52 toward the electric motor 60.

To allow the nozzle 34 to approach the electric motor 60, first the movable frame 5 of the grease filling device is advanced. When the movable frame 5 advances, the tip end 40a of the centering mandrel 40 abuts on a tip end 64a of the rotation shaft 64 of the electric motor 60. The tip end 40a of the centering mandrel 40 has a conical configuration. On the other hand, the tip end 64a of the rotation shaft 64 has a recess. By moving forward the movable frame 5 until the tip end 40a of the centering mandrel 40 is engaged in the deepest portion of the recess, the center of the centering mandrel 40 is disposed on the same axial line as the center of the rotation shaft 64.

After the center of the centering mandrel 40 coincides with the center of the rotation shaft 64 in this manner, the flanged circular plate 42 is operated by the air cylinder 44 to advance, and the nozzle 34 advances together with the flanged circular plate 42. The nozzle 34 has an annular outer configuration, and the inner diameter of its inner hole is larger than the outer diameter of the rotation shaft 64. Therefore, while the rotation shaft 64 is passed through the inner hole, the nozzle can advance along the outer periphery of the rotation shaft 64 to approach the bearing 66.

When the nozzle 34 reaches the vicinity of the outer end face of the bearing 66, the first packing 50 is elastically deformed to closely contact to the outer ring 66a of the bearing 66, while the second packing 52 is elastically deformed to closely contact to the inner ring 66b of the bearing 66. In this condition, the annular groove 54 is connected only to the operation space of the rolling elements 66c of the bearing 66. Therefore, the grease injected from the injection hole 34b is, as shown by arrows of FIG. 3, pushed into the operation space of the rolling elements 66c of the bearing 66 or temporarily pushed into the annular groove 54 to flow into the operation space of the rolling elements 66c of the bearing 66 and further into the grease pocket 68. At this time, since the first packing 50 closely contacts to the outer ring 66a while the second packing 52 closely contacts to the inner ring 66b, there is no anxiety that the grease leaks outside the bearing 66.

Therefore, by using the grease filling device, the bearing 66 does not need to be removed from the electric motor 60 during filling operation, and the outer covering of the electric motor 60 is prevented from being made dirty with the grease. Furthermore, since the grease filling does not need to be performed manually, the grease filling process can be automated.

As shown in FIG. 1, the grease filling device is provided with the similar grease filling mechanisms on the opposite sides, so that the bearing 66 on the load side of the electric motor 60 and the bearing (not shown) on the opposite side can be filled with grease simultaneously. When the bearings are simultaneously filled with grease in this manner, as compared with when the bearings are individually filled with grease, the filling operation is naturally completed earlier because of the simultaneous proceeding. Furthermore, since the electric motor 60 is sandwiched from opposite sides by a pair of nozzles 34, the electric motor 60 can be stably installed on the rest 36. Therefore, as compared with when the nozzle 34 is pushed against the electric motor 60 from one side, the pressure of the nozzle 34 can be strengthened, and sealing properties of the first packing 50 and the second packing 52 are enhanced.

In the above, an example of the grease filling device of the electric motor according to the invention has been described, but the invention is not restricted to the aforementioned embodiment.

In the device, each movable section is provided with the air cylinder as a power source for operating the section, but by using an electric motor as the power source and using a belt/pulley and various gears to constitute a power transmission mechanism, the movable section may be operated.

INDUSTRIAL APPLICABILITY

As aforementioned, in the grease filling device of the electric motor according to the invention, the bearing can be filled with the proper amount of grease without removing the bearing from the electric motor. Therefore, the device is useful when the bearing is filled with grease after cleaned without removing the bearing from the electric motor. Especially, when the bearing is periodically cleaned and filled with grease, for example, in a main motor for a railroad car, the device is remarkably convenient in that maintenance can be performed without requiring a disassembly operation. The process from the cleaning of the bearing to the grease filling can be automated.

What is claimed is:

1. A grease filling device capable of filling a bearing of an electric motor with grease without removing the bearing from the electric motor, the grease filling device comprising:

a base frame supporting a motor rest for supporting a motor to be greased, and the base frame supporting at least one rail with a movable frame being supported by and movable along the at least one rail toward and away from the motor rest;

a leading end of the movable frame supporting a nozzle for injecting grease into the bearing to be greased;

a grease tank for supplying grease to the bearing to be greased;

a metering force feed device coupled to the grease tank for receiving a supply of grease from the grease tank and for measuring a predetermined volume of grease to be supplied to an injection cylinder;

an electromagnetic valve being positioned between the metering force feed device and the injection cylinder for control a flow of grease from the metering force feed device to the injection cylinder; and the injection cylinder receiving the grease supplied by the electromagnetic valve and conveying the received grease to the nozzle for injecting into the bearing to be greased when the movable frame is moved toward the motor rest and the nozzle is engaged with the bearing to be greased.

2. The grease filling device according to claim 1, wherein the nozzle comprises a tip end face which supports a projecting and concentric first and second packing seals, the first and the second packing seals define an annular groove there between in which at least one injection hole is formed, and as the nozzle is engages with the bearing to be greased the bearing is solely contacted by the first packing seal engaging with an outer ring of the bearing to be greased and the second packing seal engaging with an inner ring of the bearing to be greased whereby grease can be injected from the nozzle, through the engagement between the first and second packing seals and the inner and outer rings, into the bearing to be greased, without removing the bearing from the electric motor.

3. The grease filling device according to claim 2, wherein the annular groove has a plurality of injection holes formed therein to facilitate passage of grease from the injection nozzle to the bearing to be greased.

4. The grease filling device according to claim 2, wherein the nozzle and the movable frame are coupled to a drive mechanism for moving the nozzle to a forward position where the tip-end face of the nozzle sealably engages with an outer end face of the bearing and a rearward position where the nozzle is spaced from the outer end face of the bearing.

5. The grease filling device according to claim 4, wherein the drive mechanism for moving the nozzle and the movable frame is an air cylinder.

6. The grease filling device according to claim 1, in combination with a motor having a bearing comprising an outer ring fixed to the electric motor, an inner ring disposed inside the outer ring and at least one rolling element interposed between the outer and inner rings, the bearing supports a rotatable shaft and has an outer end face exposed outside the electric motor for engagement with the nozzle when the bearing is to be greased.

7. The grease filling device according to claim 6, wherein a centering mandrel projects through a central annular hole of the tip-end face of the nozzle and the nozzle is slidable along the centering mandrel, the centering mandrel is axially aligned with a rotation center of the bearing to be greased to facilitate engaging a tip of the centering mandrel with the rotatable shaft of the electric motor.

8. The grease filling device according to claim 7, wherein during engagement between the tip of the centering mandrel and the rotatable shaft, the tip end face of the nozzle is pushed beyond the tip of the centering mandrel toward the bearing to be greased to enable a central annular hole to at least partially accept the rotatable shaft of the motor and the tip-end face of the nozzle is pushed against the bearing to provide the sealable engagement there between.

9. The grease filling device according to claim 6, wherein the grease filling device supports the electric motor, via the motor rest, and only engages with the electric motor via the engagement between the first packing seal with the outer ring of the bearing to be greased and engagement between the second packing seal with the inner ring of the bearing to be greased.

10. A grease filling device capable of filling a pair of bearings of an electric motor with grease without removing the bearings from the electric motor, the grease filling device comprising:

a base frame supporting a centrally located motor rest for supporting a motor to be greased, and the base frame supporting a pair of opposed rails on opposite sides of the centrally located motor rest with a movable frame being supported by and movable along each one of the pair of opposed rails toward and away from the centrally located motor rest;

a leading end of each one of the movable frames supporting a nozzle for injecting grease in one of the bearings to be greased;

a grease tank for supplying grease to the bearings to be greased;

a metering force feed device, associated with each one of the nozzles, coupled to the grease tank for receiving a supply of grease from the grease tank and for measuring a predetermined volume of grease to be supplied to an injection cylinder;

an electromagnetic valve, associated with each one of the nozzles, being positioned between the metering force feed device and the injection cylinder for control a flow of grease from the metering force feed device to the injection cylinder; and the injection cylinder, associated with each one of the nozzles, receiving the grease supplied by the electromagnetic valve and conveying the received grease to the nozzle for injecting into one of the bearings to be greased, whereby when both of the movable frames are moved toward the motor rest and the nozzles each engage with one of the bearings to be greased, the pair of bearings of the electric motor can be simultaneously filled.

11. The grease filling device according to claim 10, wherein each nozzle comprises a tip end face which supports projecting and concentric first and second packing seals, the first and the second packing seals define an annular groove there between in which at least one injection hole is formed, and as each nozzle is brought toward engagement with one of the bearings to be greased, each one of the bearings to be greased is solely engaged by the first packing seal engaging with an outer ring of the bearing to be greased and the second packing seal engaging with an inner ring of the bearing to be greased whereby grease can be injected from each of the nozzles, through the engagement between the first and second packing seals and the inner and outer rings, into the bearings to be greased, without removing the bearings from the electric motor.

12. The grease filling device according to claim 11, wherein each of the annular grooves has a plurality of injection holes formed therein to facilitate passage of grease from the injection nozzles to the bearings to be greased.

13. The grease filling device according to claim 12, wherein a separate drive mechanism is coupled to each one of the movable frames for moving the respective nozzle to a forward position where a tip-end face of the nozzle sealably engages with an outer end face of one of the bearings to be greased and a rearward position where the respective nozzle is spaced from the outer end face of one of the bearings to be greased.

14. The grease filling device according to claim 13, wherein each of drive mechanisms for moving the respective nozzles and the movable frames is an air cylinder.

15. The grease filling device according to claim 10, in combination with a motor having a pair of opposed bearings with each opposed bearings comprising an outer ring fixed to the electric motor, an inner ring disposed inside the outer ring and at least one rolling element interposed between the outer and inner rings, both bearings support a rotatable shaft which has outer end faces exposed outside the electric motor for engagement with one of the nozzles.

16. The grease filling device according to claim 15, wherein a centering mandrel projects through a central annular hole of a tip-end face of each nozzle and each nozzle is slidable along the centering mandrel, the centering mandrel is axially aligned with a rotation center of one of the bearings to be greased to facilitate engaging a tip of the centering mandrel with the rotatable shaft of the electric motor.

17. The grease filling device according to claim 16, wherein during engagement between the tip of the centering mandrel and the rotatable shaft, the tip end face of the nozzle is pushed beyond the tip of the centering mandrel toward one of the bearings to be greased to enable a central annular hole to at least partially accept the rotatable shaft of the electric motor and the tip-end face of the nozzle is pushed against the respective bearing to provide the sealable engagement therebetween.

18. The grease filling device according to claim 15, wherein the grease filling device supports the electric motor on the motor rest and only engages with the electric motor via engagement between the first packing seals with the outer rings of the bearings to be greased and engagement between the second packing seals with the inner rings of the bearings to be greased.

19. A grease filling device capable of filling a bearing of an electric motor with grease without removing the bearing from the electric motor in combination with an electric motor having a bearing comprising an outer ring fixed to the electric motor, an inner ring disposed inside the outer ring and at least one rolling element interposed between the outer and inner rings, the bearing supports a rotatable shaft and has an outer end face exposed outside the electric motor for engagement with the nozzle when the bearing is to be greased, the grease filling device comprising:

a base frame supporting a motor rest for supporting a motor to be greased, and the base frame supporting at least one rail with a movable frame being supported by and movable along the at least one rail toward and away from the motor rest;

a leading end of the movable frame supporting a nozzle for injecting grease into the bearing to be greased, the nozzle and the movable frame are coupled to a drive mechanism for moving the nozzle to a forward position where a tip-end face of the nozzle sealably engages with an outer end face of the bearing and a rearward position where the nozzle is spaced from the outer end face of the bearing;

a centering mandrel projects through a central annular hole of the tip-end face of the nozzle and the nozzle is slidable along the centering mandrel, the centering mandrel is axially aligned with a rotation center of the bearing to be greased to facilitate engaging a tip of the centering mandrel with the rotatable shaft of the electric motor;

a grease tank for supplying grease to the bearing to be greased;

a metering force feed device coupled to the grease tank for receiving a supply of grease from the grease tank and for measuring a predetermined volume of grease to be supplied to an injection cylinder;

an electromagnetic valve being positioned between the metering force feed device and the injection cylinder for control a flow of grease from the metering force feed device to the injection cylinder; and the injection cylinder receiving the grease supplied by the electromagnetic valve and conveying the received grease to the nozzle for injecting into the bearing to be greased when the movable frame is moved toward the motor rest and the nozzle is engaged with the bearing to be greased.

20. The grease filling device according to claim 19, wherein the nozzle comprises a tip end face which supports a projecting and concentric first and second packing seals, the first and the second packing seals define an annular groove there between in which at least one injection hole is formed, and as the nozzle is engages with the bearing to be greased the bearing is solely engaged by the first packing seal engaging with the outer ring of the bearing to be greased and the second packing seal engaging with the inner ring of the bearing to be greased whereby grease can be injected from the nozzle, through the engagement between the first and second packing seals and the inner and outer rings, into the bearing to be greased, without removing the bearing from the electric motor; and during engagement between a tip of the centering mandrel and the rotatable shaft, a tip end face of the nozzle is pushed beyond the tip of the centering mandrel towards the bearing to be greased to enable a central annular hole to at least partially accept the rotatable shaft of the motor and the tip-end face of the nozzle is pushed against the bearing to provide the sealable engagement therebetween.

* * * * *